US006088898A

United States Patent [19]

Lundsten

[11] Patent Number: 6,088,898

[45] Date of Patent: *Jul. 18, 2000

[54] BLIND HOLE BEARING PULLER

[76] Inventor: James D. Lundsten, P.O. Box 495, Ellington, N.Y. 14732

[ * ] Notice: This patent is subject to a terminal disclaimer.

[21] Appl. No.: 08/822,052

[22] Filed: Mar. 24, 1997

Related U.S. Application Data

[63] Continuation-in-part of application No. 08/570,409, Dec. 11, 1995, Pat. No. 5,613,288.

[51] Int. Cl.$^{7}$ .................................................... B23P 19/04

[52] U.S. Cl. ................................ 29/255; 29/275; 29/282

[58] Field of Search ............................ 29/255, 254, 275, 29/263, 282, 258, 243, 518; 264/99, 100

[56] References Cited

U.S. PATENT DOCUMENTS

| | | | |
|---|---|---|---|
| 1,992,474 | 2/1935 | Currier | 29/263 |
| 2,380,068 | 7/1945 | Patton . | |
| 2,380,980 | 8/1945 | Looney | 29/263 |
| 2,662,276 | 12/1953 | Sheaffer . | |
| 3,083,449 | 4/1963 | Simmons . | |
| 3,945,104 | 3/1976 | Brookover, Jr. . | |
| 4,110,886 | 9/1978 | Wendler et al. . | |
| 4,724,608 | 2/1988 | Parrott | 29/282 |
| 5,058,255 | 10/1991 | Qualkenbush . | |
| 5,165,156 | 11/1992 | Shultz | 29/263 |
| 5,251,368 | 10/1993 | Somerville et al. . | |
| 5,406,685 | 4/1995 | Harmand | 29/255 |
| 5,613,288 | 3/1997 | Lundsten | 29/255 |

*Primary Examiner*—Robert C. Watson
*Attorney, Agent, or Firm*—The Bilicki Law Firm, P.C.

[57] ABSTRACT

A puller tool is comprised of a finger guide member having a central through bore and containing one or more fingers arranged for radial movement therein, an elongated actuating member having a rearward end and a forward end which passes through the central through bore. The finger guide member is positioned between the forward and rearward end, and an engagement head is mounted to the forward end of the elongated actuating member and is operatively arranged to contact the one or more fingers and cause the radial movement when the engagement head is moved toward the finger guide member.

10 Claims, 14 Drawing Sheets

BLIND HOLE BEARING PULLER

This is a continuation-in-part of copending U.S. application Ser. No. 08/570,409 filed Dec. 11, 1995 now U.S. Pat. No. 5,613,288.

BACKGROUND OF THE INVENTION

The present invention relates generally to puller tools for removing internal bearings, bushings, sleeves and the like, and more particularly to a puller tool useful in removing the aforementioned items from a blind hole.

A widely recognized difficulty in the servicing of precision spindles is the removal of tapered roller, and angular contact bearings from deep within a blind hole. Removal is problematic because, while an inner roller portion of the bearing is often easily extracted, an outer sleeve of the bearing remains lodged within the hole in close circumferential fit and with a distal annular face thereof flush against a bottom seat surface of the hole. A similar problem is encountered in other service industries, for example in the automotive repair industry, where bearings must be removed from wheel/brake housings.

A variety of puller tools have been developed for extracting internally seated bearings and like items having an axial bore or opening extending between opposite annular faces thereof. A first type of puller tool is generally characterized by means insertable within the bore or opening for engaging an inner wall of the item, or for engaging a specially formed recess, hole, or step in the inner wall. Examples of this first type of puller tool may be found in U.S. Pat. Nos. 4,110,886; 2,662,276; and 2,380,068. A second type of puller tool is generally characterized by means insertable through the bore or opening for engaging a distal annular face of the item. Examples of this second type of puller tool are disclosed in U.S. Pat. Nos. 5,251,368; 5,058,255; 3,945,104; and 3,083,449.

Puller tools of the first type mentioned above have the disadvantage that they usually require a specially formed step or hole in the inner wall of the item to be extracted for engagement by the puller tool, because the distal annular face of the item is not engaged. If the puller tool is designed to directly engage the inner wall, damage to the inner wall may occur, a result which is not acceptable in expensive, high-precision bearings. Puller tools of the second type require clearance adjacent the distal annular face of the item to permit engagement of the face by the puller tool. Consequently, where the item is seated within a blind hole with its distal annular face flush against a bottom or seat surface of the hole, puller tools of the second type are ineffective.

SUMMARY OF THE INVENTION

Therefore, it is an object of the present invention to provide a puller tool which is effective in removing an internally seated bearing, bushing, sleeve, or similar item from a blind hole.

Briefly, a puller tool of the present invention is characterized by wedge means for radially directed insertion between a distal annular face of the item to be removed and a seat surface of a blind hole for separating the annular face from the seat surface, thereby enabling the annular face to be engaged for purposes of pulling the item from the hole.

In a preferred embodiment of the present invention, wedge means comprises a guide member threadably mounted at a forward end of an elongated actuating member to permit axial motion of the actuating member relative to the guide member, and a plurality of fingers mounted within guide channels on the guide member in angularly spaced relationship about the longitudinal axis for radially directed motion normal to the axis. Each finger has a radially inner cam surface and a radially outer wedge portion terminating in a peripheral insertion edge at a forwardmost extent of the puller tool. The actuating member includes a chamfered engagement head arranged to engage the cam surfaces of the fingers such that when the actuating member is moved toward the guide member, the fingers are simultaneously forced to move radially outward.

In use, a forward end of the puller tool is inserted into the blind hole and through a central opening or bore of the internally situated item until the insertion edge of each wedge surface is against the seat surface of the hole. The actuating member may then be rotated about its longitudinal axis, such as by manual rotation of a handle provided at the rear end thereof, to force each insertion edge and wedge surface between the seat surface and annular face of the item. A slide hammer and impact member are preferably provided on the actuating member for forcing the puller tool in an axial direction to extract both the item and puller tool from the hole.

In another embodiment of the present invention the puller tool is comprised of a finger guide member having a central through bore and containing one or more fingers arranged for radial movement therein, an elongated actuating member having a rearward end and a forward end which passes through the central through bore. The finger guide member is positioned between the forward and rearward end, and an engagement head is mounted to the forward end of the elongated actuating member and is operatively arranged to contact the one or more fingers and cause the radial movement when the engagement head is moved toward the finger guide member.

DETAILED DESCRIPTION OF A PREFERRED EMBODIMENT

The nature and mode of operation of the present invention will now be more fully described in the following detailed description of a preferred embodiment and alternative embodiments to be read together with the accompanying drawing figures. As used herein, the term "rearwardly" indicates direction, that being upward when viewing FIGS. 1–3, 8–9, 10–12, 17–20, and 22 in an upright manner. Moreover, the most "rearward" position on the puller tool is the handle thereof. Furthermore, as used herein, the term "forward" indicates position on the puller tool and indicates a position below the rearward position when viewing the FIGS. 1–3, 8–9, 10–12, 17–20, and 22 in an upright manner. For example, the forward face on the finger guide member is more forwardly than the rearward face.

Figure 1:
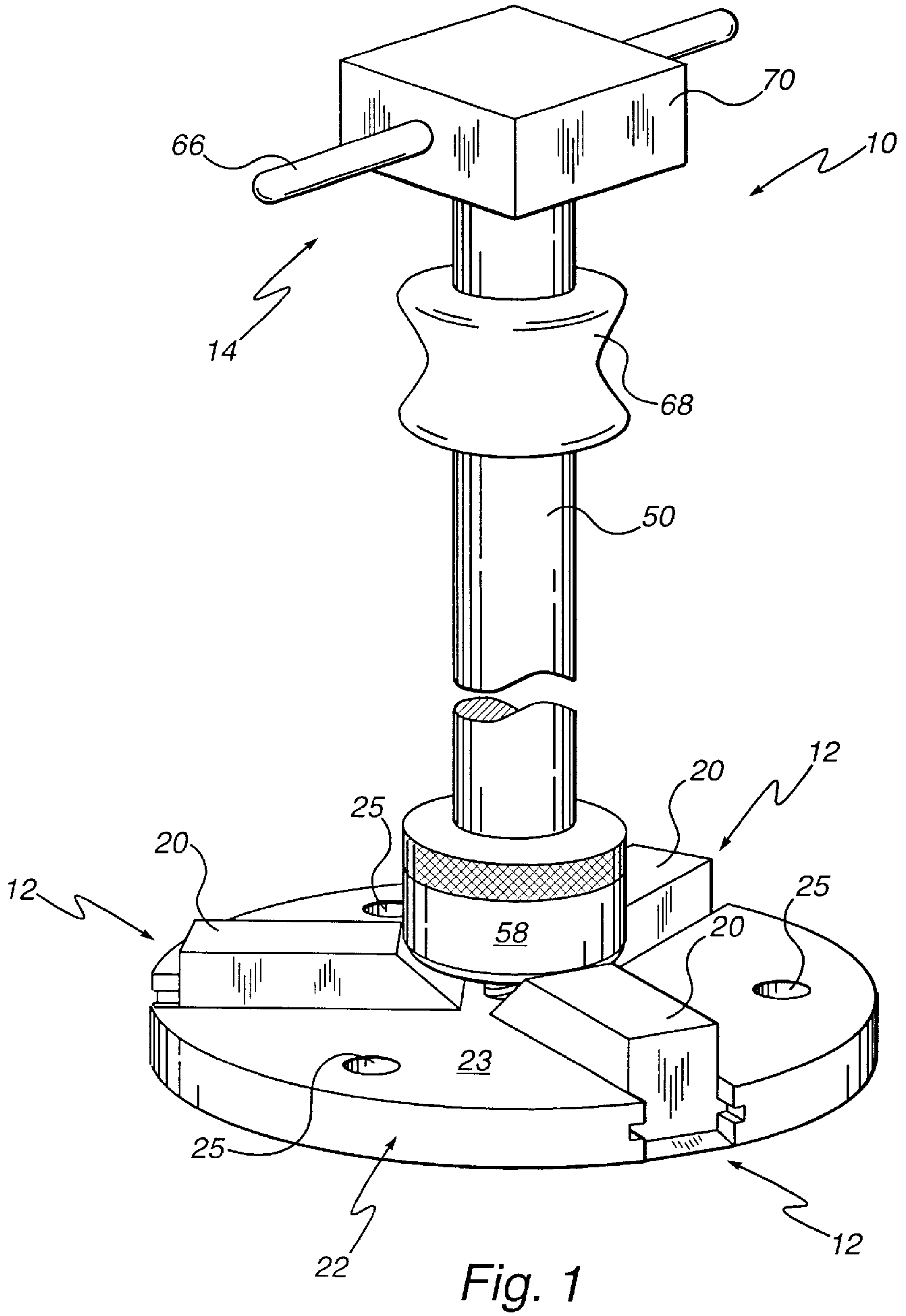
FIG. 1 is a perspective view of a bearing puller formed in accordance with a preferred embodiment of the present invention.
Figure 2:
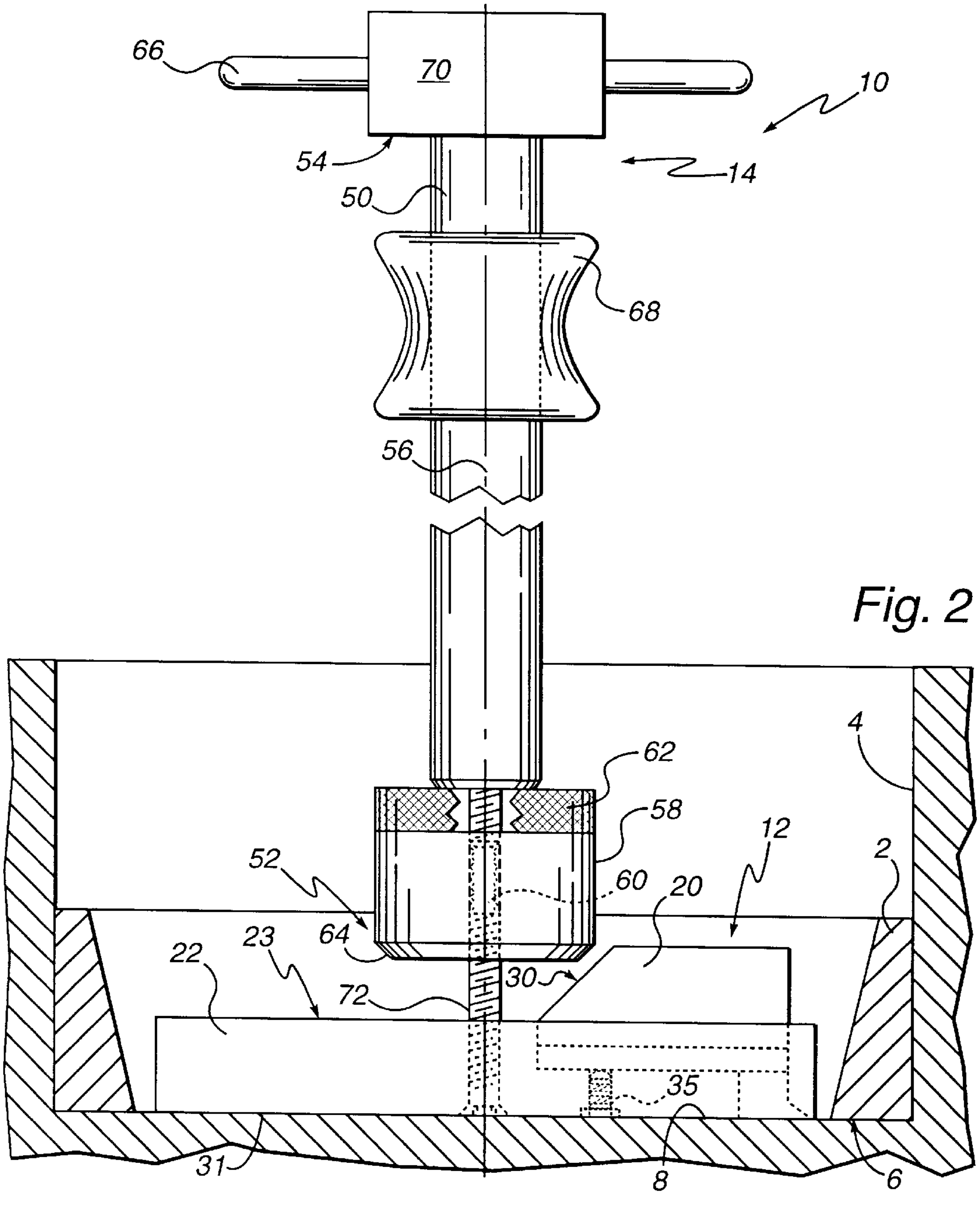
FIG. 2 is a side elevational view thereof, with only one finger being shown in a retracted position in preparation for removal of a bearing sleeve from a blind hole.
Figure 3:
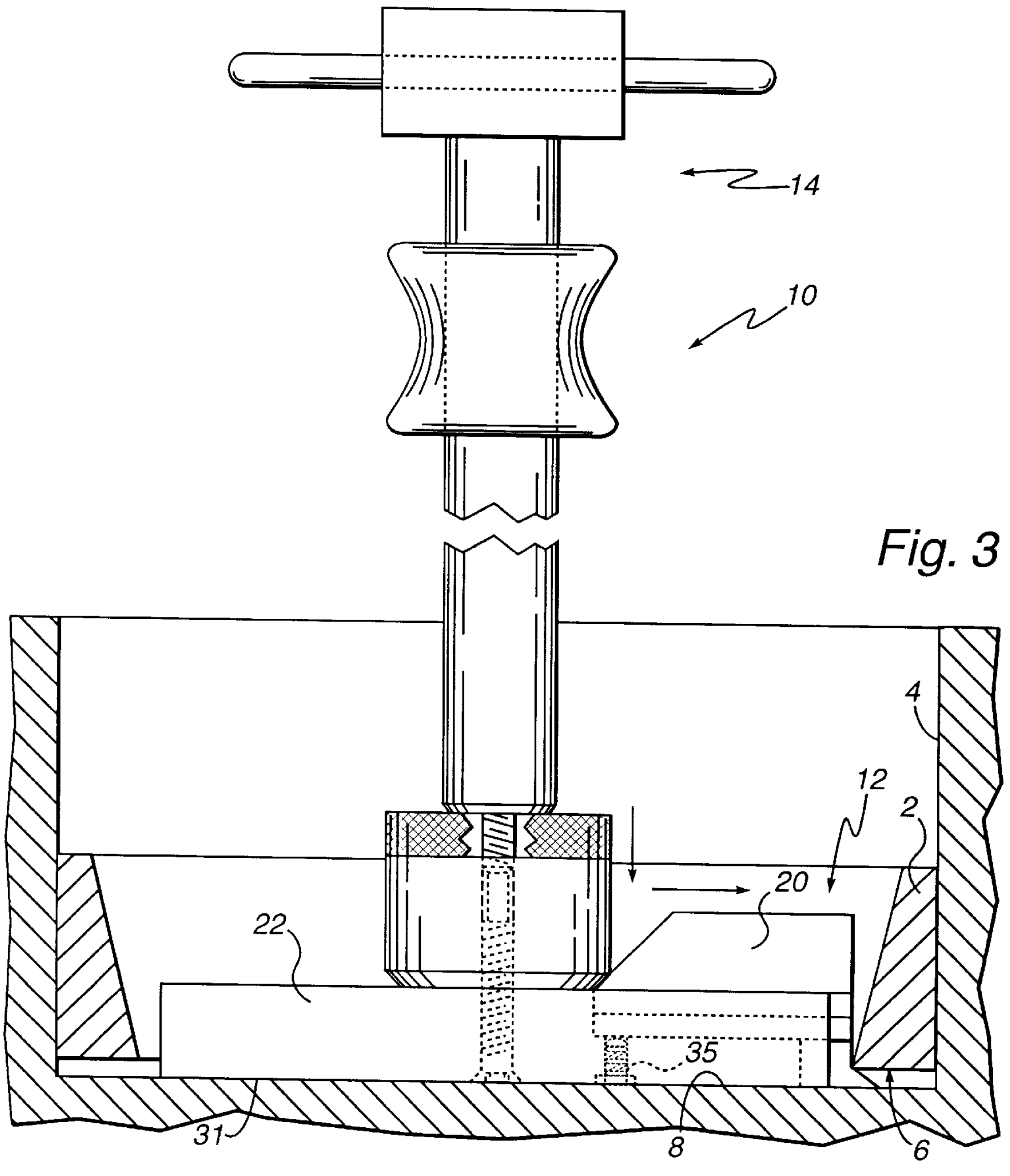
FIG. 3 is a view similar to that of FIG. 2 showing the finger in an extended position during removal of the bearing sleeve from the blind hole.
Figure 4:
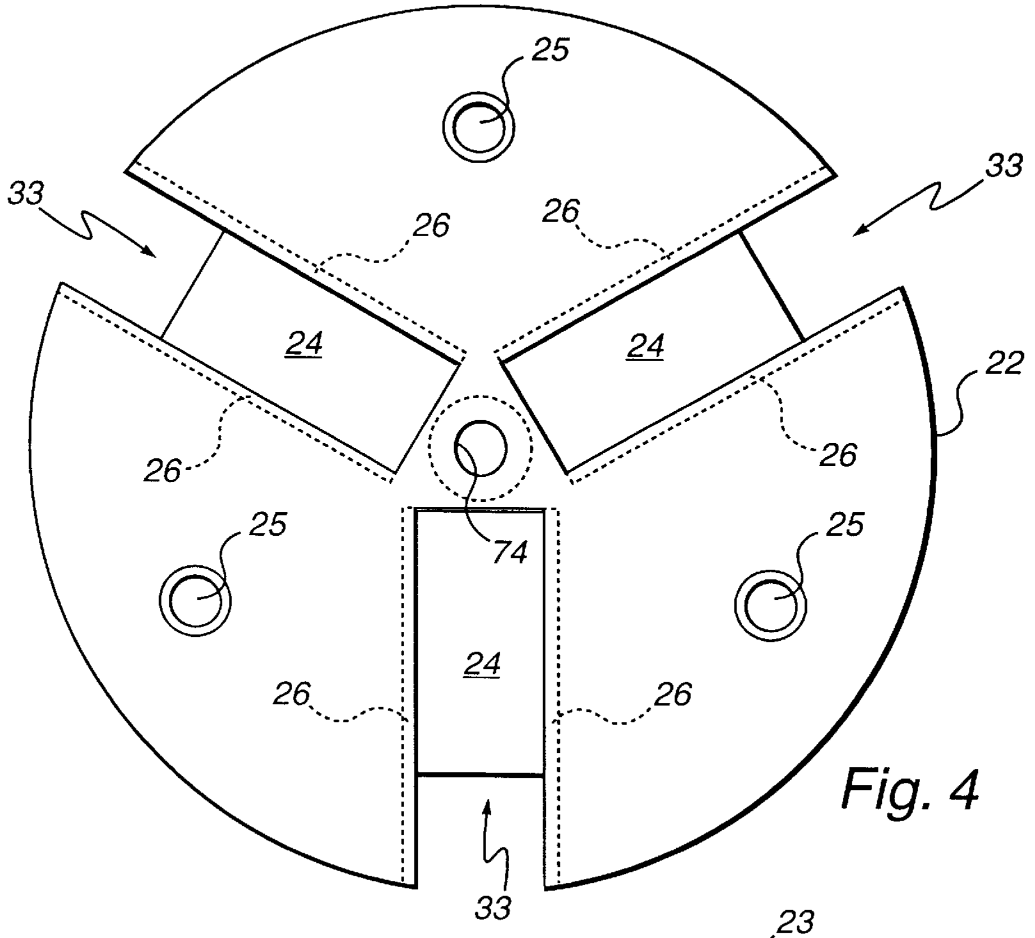
FIG. 4 is a top plan view of a preferred finger guide member of the present invention.
Figure 5:
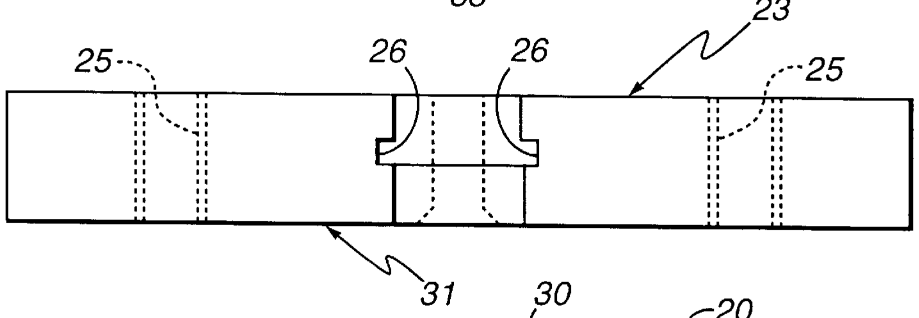
FIG. 5 is a side elevational view thereof.
Figure 6:
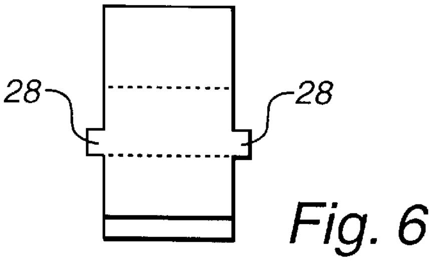
FIG. 6 is a front elevational view of a preferred finger of the present invention.
Figure 7:
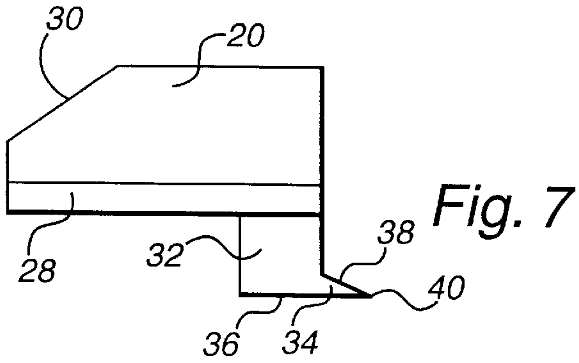
FIG. 7 is a side elevational view thereof.
Figure 8:
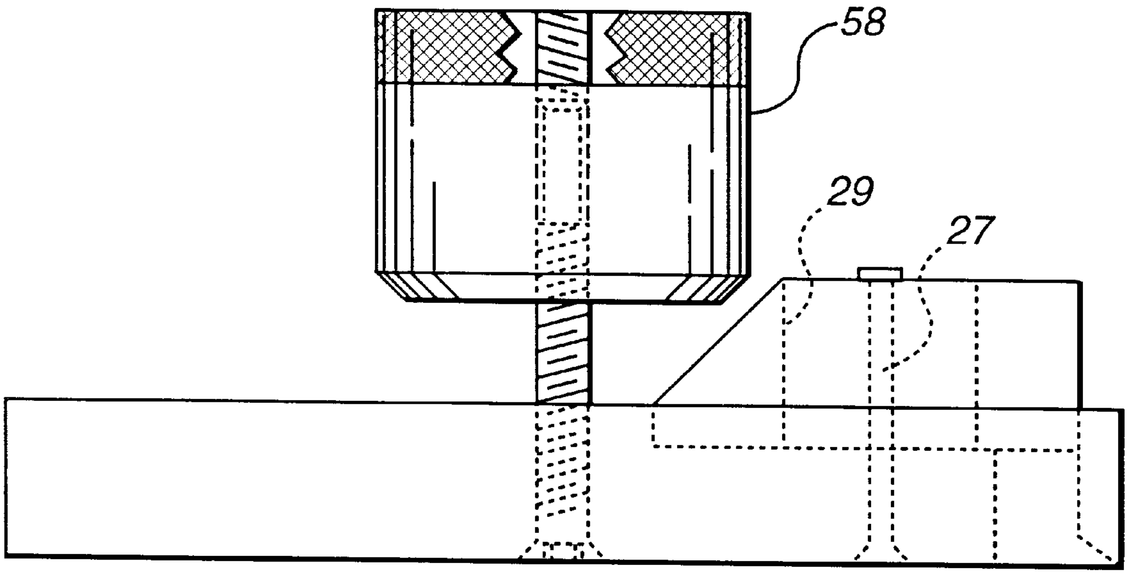
FIG. 8 is a partial side elevational view of a second embodiment of the present invention having alternative means for mounting the fingers on the finger guide member.
Figure 9:
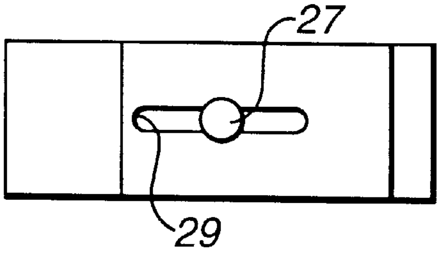
FIG. 9 is a partial top plan view of the embodiment depicted in FIG. 8.
Figure 10:
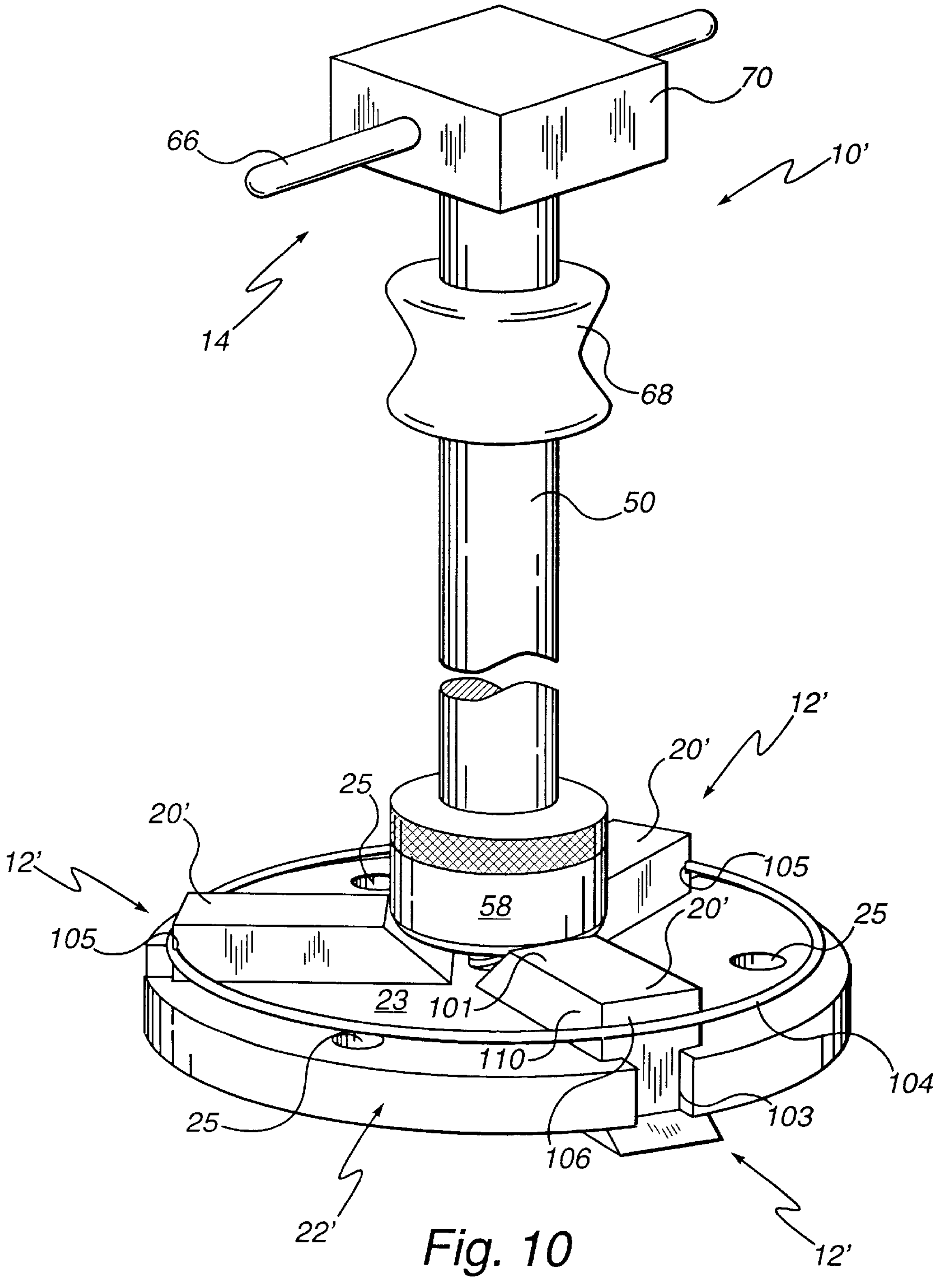
FIG. 10 is a perspective view of a bearing puller formed in accordance with a second preferred embodiment of the present invention.
Figure 11:
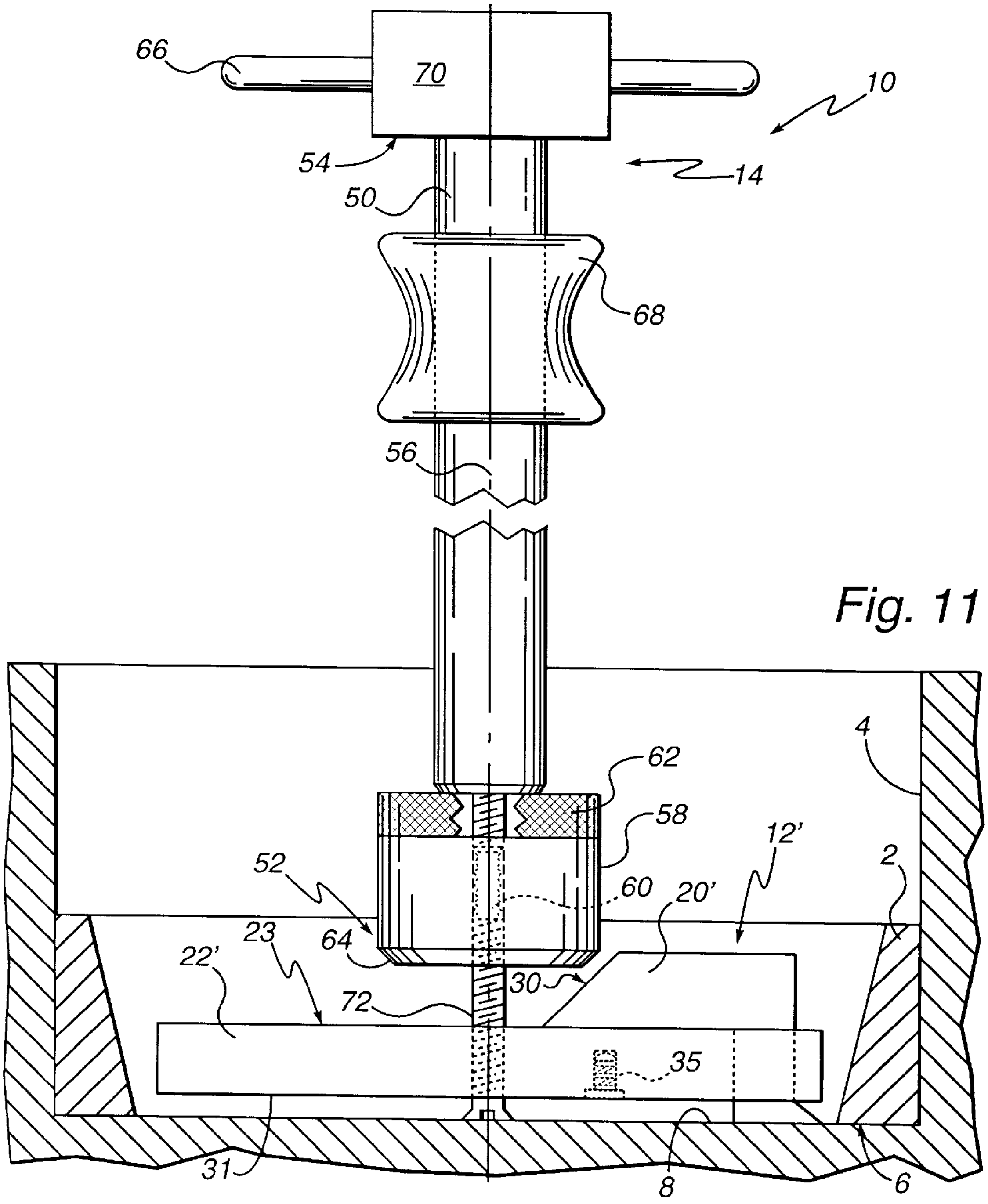
FIG. 11 is a side elevational view thereof, with only one finger being shown in a retracted position in preparation for removal of a bearing sleeve from a blind hole.
Figure 12:
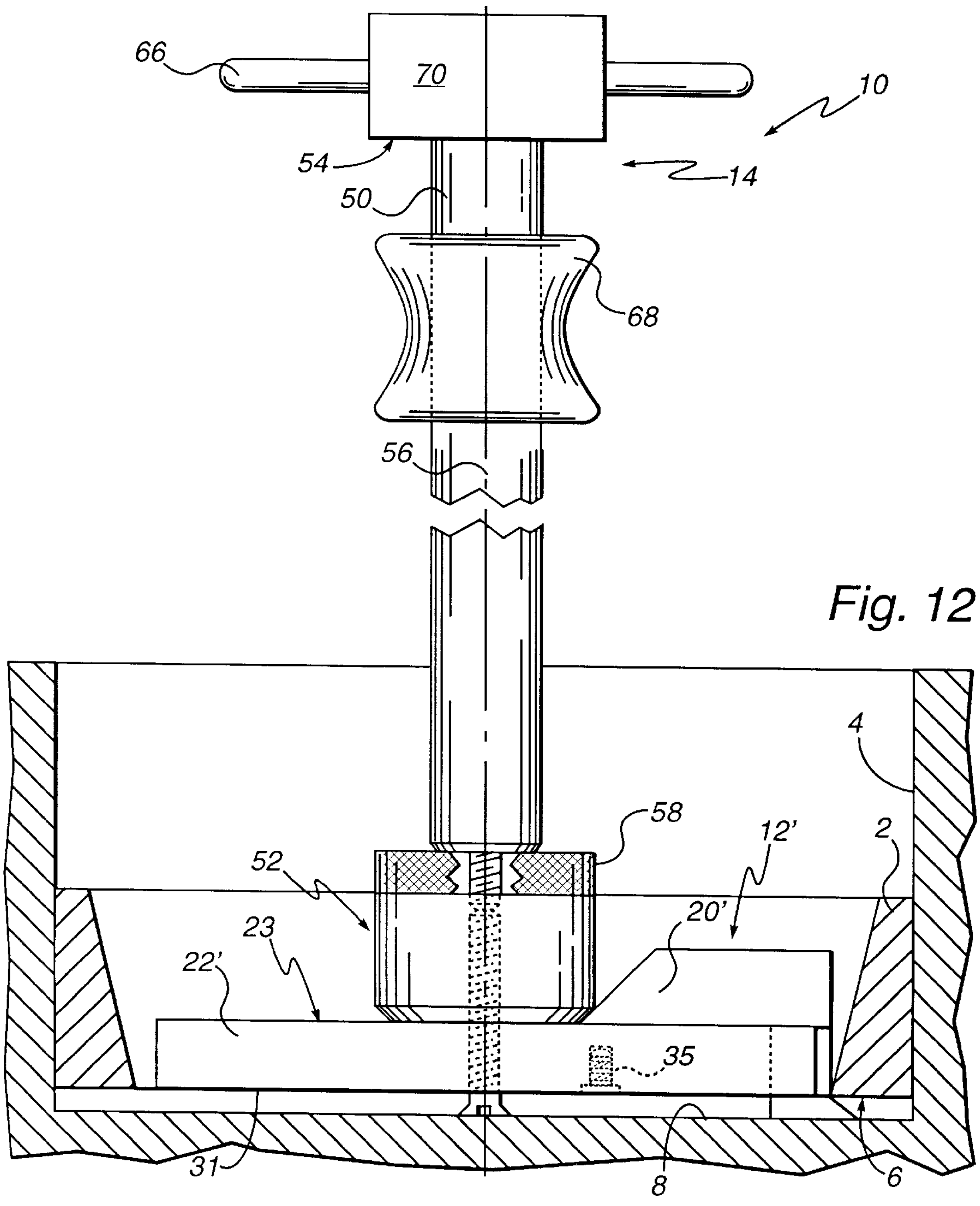
FIG. 12 is a view similar to that of FIG. 11 showing the finger in an extended position during removal of the bearing sleeve from the blind hole.

Reference is initially made to FIGS. 1–3 of the drawings, wherein a blind hole bearing puller formed in accordance with a preferred embodiment of the present invention is illustrated and identified by the numeral 10. Bearing puller 10 is designed particularly for extracting a bearing, bushing, sleeve or like item 2 from a blind hole 4 where a distal annular face 6 of the item is situated flush against a seat surface 8 of the hole.

Puller 10, the parts of which may be machined from alloy steel or other suitable material, includes wedge means generally designated as 12 at a forward end thereof for radially directed insertion between the seat surface and annular face of the item, and actuating means generally designated as 14 for allowing a user to operate wedge means 12. As will be understood from the forthcoming description, wedge means 12 of the present invention acts to separate the item 2 to be removed, hereinafter referred to as a bearing sleeve for sake of descriptive simplicity, from the seat surface 8 of blind hole 4 as an initial step in the removal process.

Referring also now to FIGS. 4–7, wedge means 12 of the preferred embodiment is a subassembly comprising a plurality of, and, most preferably, three fingers 20 mounted on a disk-shaped circular guide member 22 in angularly spaced relationship for motion along radially extending channels 24 formed in a rear face 23 of guide member 22. Channels 24 are preferably provided with opposed lateral slots 26, and a portion of each finger 20 is provided with side flanges 28 for receipt within slots 26. Such complementary T-shaped cross-sectional mating between fingers 20 and channels 24 serves to hold fingers 20 on guide member 22 while permitting slidable, radially directed motion of fingers 20. Preferably, a plurality of spring loaded plungers 35 are mounted in guide member 22 for engagement with fingers 20 to increase frictional resistance to radial movement of the fingers to prevent the fingers from sliding out of channels 24. In a second embodiment, shown in FIGS. 8 and 9, each finger 20 is mounted within channels 24 on guide member 22 by a guide pin 27 received within an elongated keyway 29 provided in the finger. Guide member 22 is preferably provided with a plurality of threaded jacking screw holes 25 angularly spaced about the center of guide member 22 intermediate channels 24 and extending from rear face 23 through a forward face 31 of guide member 22 for threaded jacking screws (not shown) used to force the bearing puller 10 and sleeve 2 out of blind hole 4 where sleeve 2 is very tightly lodged.

Each finger 20 includes a radially inner cam surface 30, a right angle portion 32 extending in a forward direction substantially perpendicular to the direction of travel of finger 20, and a radially outer wedge portion 34.

When fingers 20 are in a radially retracted position, as shown in FIG. 2, right angle portions 32 are preferably received within inlet openings 33 provided in channels 24, thereby maintaining fingers 20 substantially within the circumferential boundary of guide member 22. Cam surface 30 may be a planar surface inclined toward the center of guide member 22. Wedge portion 34 includes a base surface 36 intended for engagement with seat surface 8 of hole 4 and an inclined wedge surface 38 terminating in a peripheral insertion edge 40. The slope of wedge surface 38 relative to base surface 36 is preferably gradual, on the order of 30–40 degrees, to facilitate successive insertion of insertion edge 40 and wedge surface 38 between seat surface 8 and bearing sleeve face 6 incident to radially directed movement of finger 20. As will be appreciated, base surfaces 36, and more importantly insertion edges 40, define a forwardmost extent of puller 10 such that they may collectively be placed into engagement with seat surface 8 prior to the fingers being forced radially outward by actuating means 14 during removal of bearing sleeve 2.

Actuating means 14, seen in FIGS. 2 and 3, comprises an elongated actuating member 50 having a forward end 52 and a rear end 54 connected by a longitudinal axis 56. A portion of actuating member 50 is threaded adjacent forward end 52 to permit attachment of an enlarged cylindrical engagement head 58 having a central tapped through hole 60. Engagement head 58 includes a knurled outer portion 62 adjacent a rear attachment end thereof to facilitate manual rotation of the engagement head, and a circumferential chamfer surface 64 at a forward end thereof arranged for flush engagement with cam surfaces 30 of fingers 20. While engagement head 58 is disclosed herein as being a separate part attachable to actuating member 50, which carries the advantage that differently sized engagement heads and wedge means may be attached to an actuating member as required for extraction of differently sized items, the engagement head may of course be integrally formed with the actuating member without straying from the scope of the present invention. A handle 66 is provided at rear end 54 of actuating member 50 to enable manual rotation of the actuating member and engagement head 58 attached thereto. A slide hammer 68 is preferably mounted on actuating member 50 for manual sliding motion therealong, and an impact block 70 is fixed at rear end 54 for engagement by slide hammer 68 to enable puller 10 and bearing sleeve 2 engaged by the puller to be forced in a rearward direction out of blind hole 4.

Guide member 22 is mounted to actuating head 58 by a threaded stud 72 extending axially through a central threaded opening 74 in guide member 22 into threaded engagement with tapped hole 60, whereby rotation of actuating member 50 relative to guide member 22 about longitudinal axis 56 moves actuating member 50 and engagement head 58 closer to or away from rear face 23 of guide member 22, depending on the direction of rotation. As will be apparent to those skilled in the art, when engagement head 58 is moved toward rear face 23 of guide member 22, fingers 20 are simultaneously forced radially outward by sliding engagement of chamfer surface 64 with cam surfaces 30 from a retracted position shown in FIG. 2 to an extended position shown in FIG. 3.

The dimensions of puller 10, and in particular the diameter of guide member 22 and length of actuating member 50, depend chiefly upon the inner diameter of bearing sleeve 2 and the depth of hole 4, respectively. Consequently, it is contemplated to provide actuating members 50 of different lengths, as well as engagement heads 58 and guide members 22 of different diameters having fingers with different extended reaches, for removal of variously sized items from holes of various depths.

To extract bearing sleeve 2 from blind hole 4, a user inserts retracted wedge means 12 within hole 4 and through the axial opening in bearing sleeve 2 until finger base surfaces 36 and insertion edges 40 engage seat surface 8. With wedge means 12 so situated, the user turns handle 66 in a clockwise direction to cause actuating head 58 to move axially forward toward guide member rear face 23, thereby forcing fingers 20 radially outward. Once bearing sleeve 2 is separated from seat surface 8 by wedge portions 34, puller 10 is pulled out of hole 4, if necessary by moving slide hammer 68 in a rearward direction until it impacts with impact block 70. Once puller 10 and bearing sleeve 2 have been withdrawn from hole 4, puller 10 may be reset to a retracted condition by rotating actuating member 50 in a counterclockwise direction to move it away from rear face 23, and then manually pushing fingers 20 radially inward toward the center of guide member 22.

Figure 13:
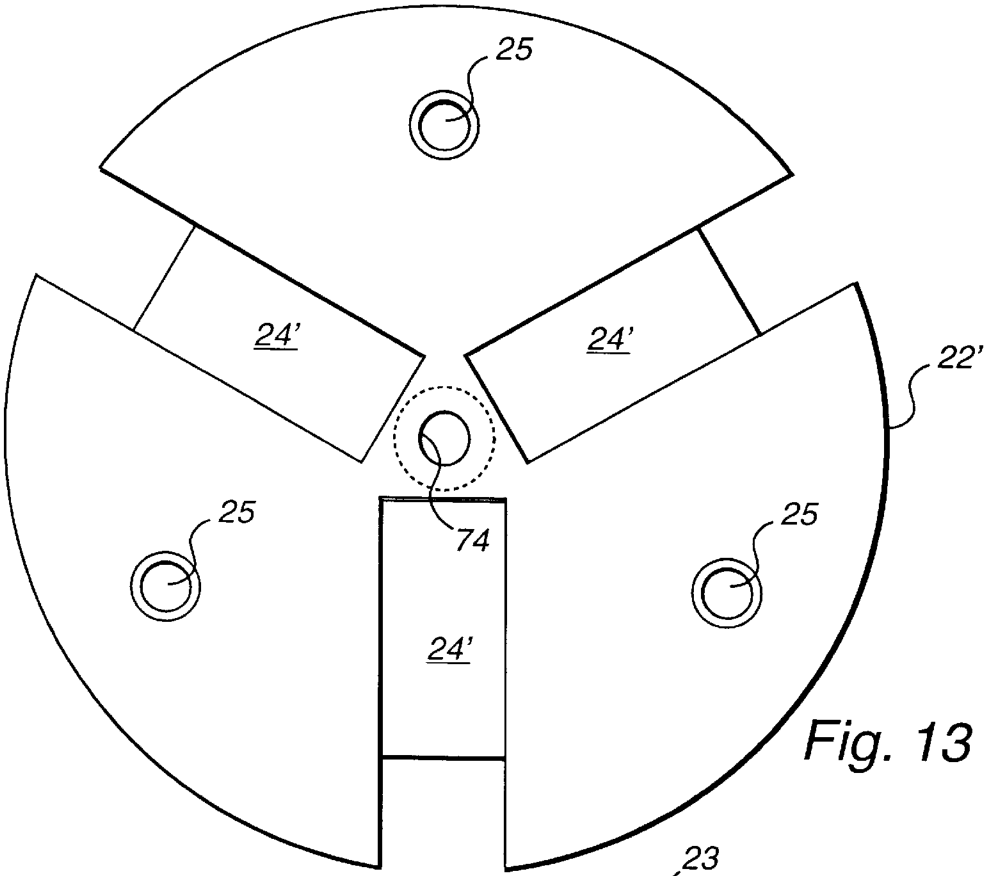
FIG. 13 is a top plan view of a second embodiment of a finger guide member of the present invention.
Figure 14:
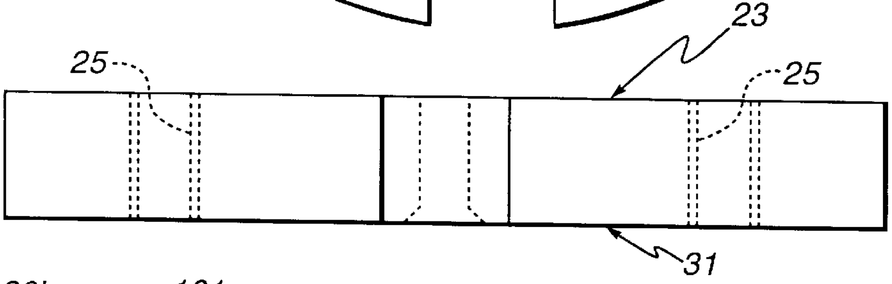
FIG. 14 is a side elevational view thereof.
Figure 15:
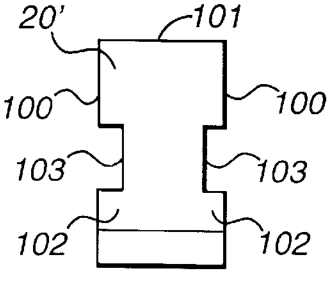
FIG. 15 is a front elevational view of a second embodiment of a finger of the present invention.

As illustrated in FIGS. 10–17*a*, in an alternative embodiment of the present invention, disk shaped circular guide member 22' contains channels 24' radially disposed in the guide member (shown in FIG. 13). Channels 24' are generally rectangular in shape and extend inwardly from the perimeter but do extend completely to the center. As shown particularly in FIG. 10 and 15, each finger 20' is a single element having of a plurality of upper shoulders 100 extending outwardly from top surface 101 of finger 20', and extending over rear face 23 of guide member 22'. Finger 20' is further defined by a plurality of lower shoulders 102 extending outward from 15 base surface 36' of finger 20', and extending over forward face 31 of guide member 22'. Upper and lower shoulders define recessed portions 103 which, in combination with shoulders 100 and 102, loosely grip finger guide member 22' and facilitate consistent movement of fingers 20' within channels 24'.

Figure 16:
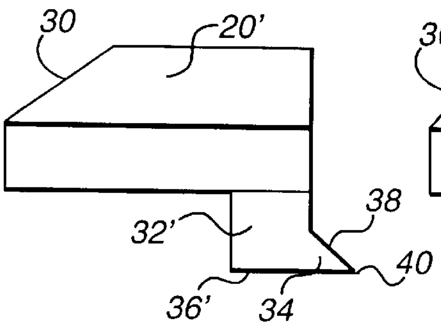
FIG. 16 is a side elevational view of a second embodiment of a finger of the present invention.
Figure 16A:
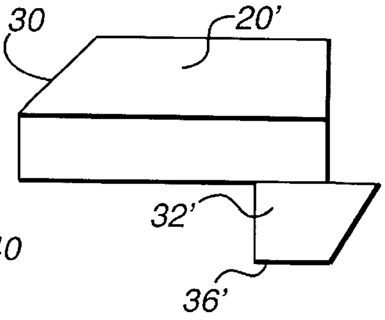
FIG. 16*a* is a side elevational view of a third embodiment of a finger of the present invention
Figure 17:
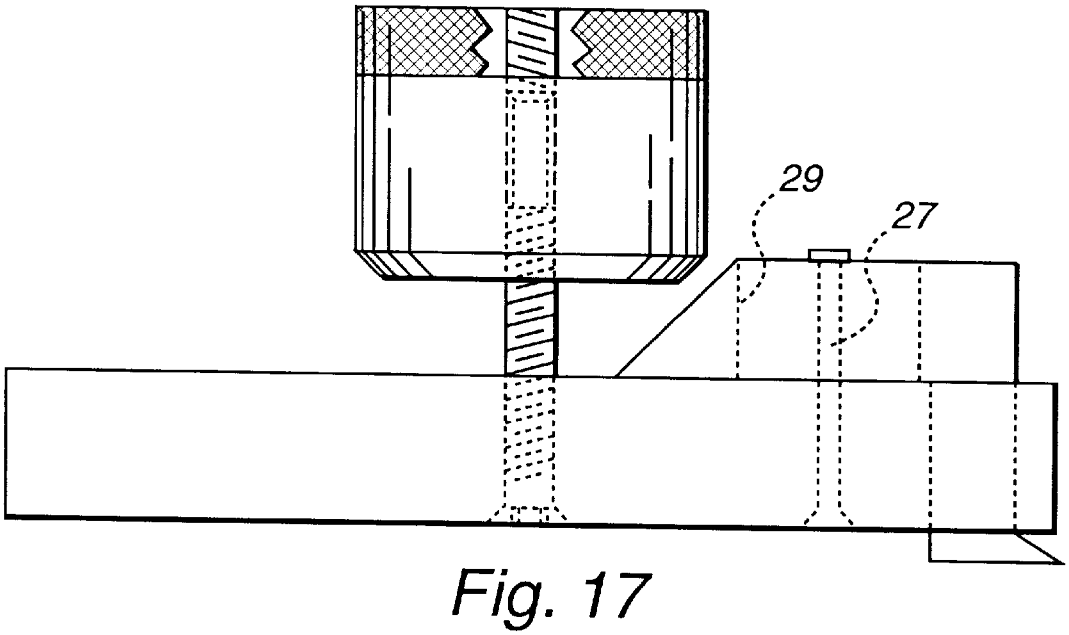
FIG. 17 is a side elevational view of a second embodiment of the present invention having alternative means for mounting the fingers on the finger guide member.
Figure 17A:
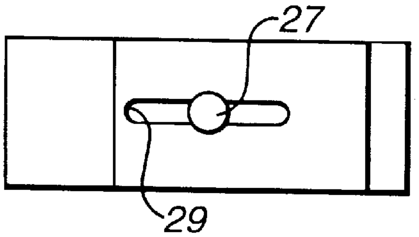
FIG. 17*a* is a partial top plan view of the embodiment depicted in FIG. 17.
Figure 18:
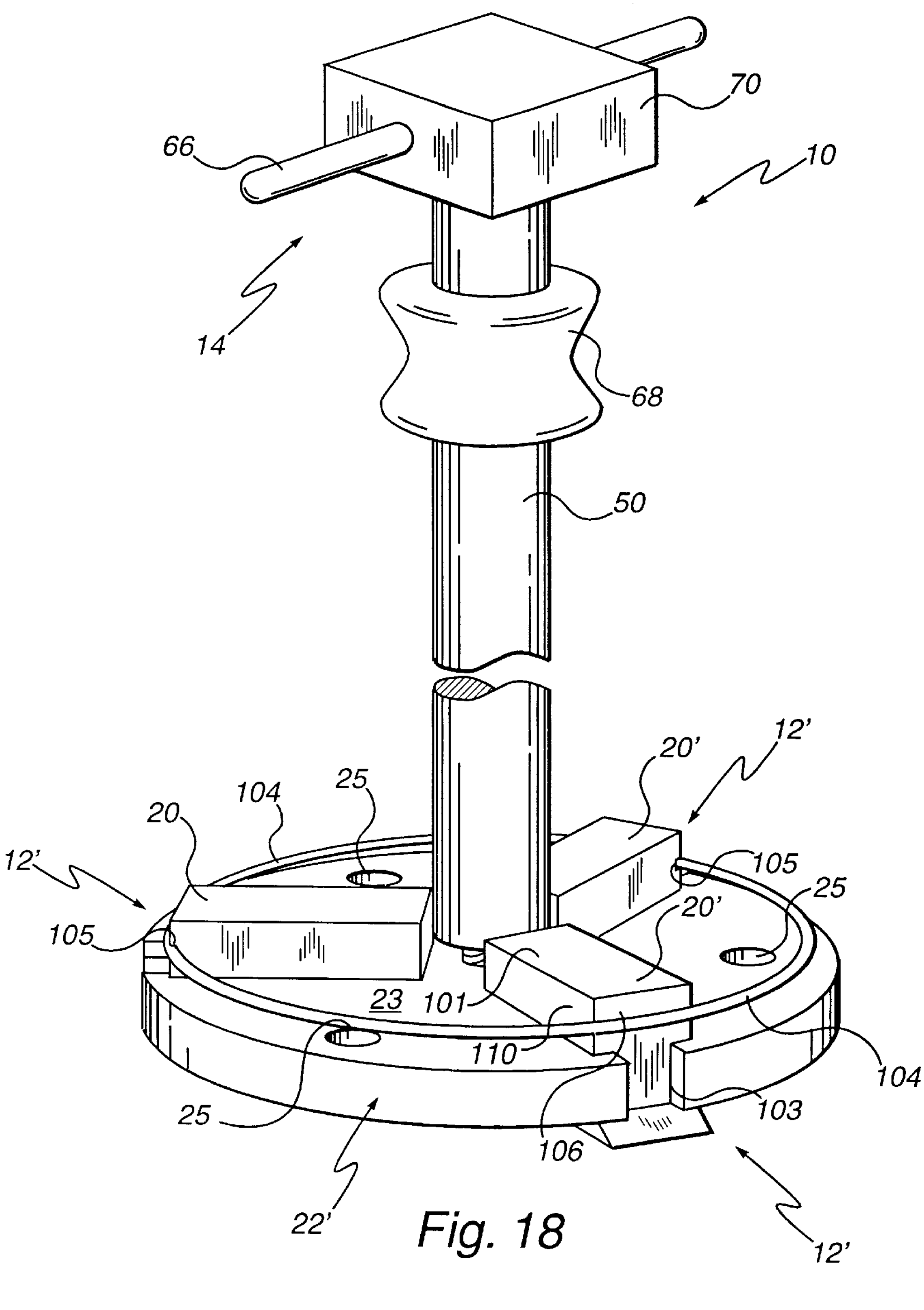
FIG. 18 is a perspective view of a bearing puller formed in accordance with a third embodiment of the present invention.

As shown in FIG. 16*a*, inverted right angled portion 32' may also be used in place of right angled portion 32 (shown in FIG. 7) for insertion and removal of an object in an open hole, as opposed to a blind hole.

A third embodiment of the present invention is shown in FIGS. 18–21. In particular, actuating means 14, seen in FIGS. 18–20, comprises an elongated actuating member 50 having a forward end 52' and a rearward end 54 connected by a longitudinal axis 56. Stud 72' is adjacent forward end 52' and engages finger guide member 22'. Stud 72' is positioned moveably within central opening 74. Central opening 74 and stud 72' are preferably threaded. Engagement head 58' includes a circumferential chamfer surface 64' at a forward end thereof arranged for flush engagement with cam surfaces 30' of fingers 20'.

While engagement head 58' is disclosed herein as being a separate part attachable to actuating member 50, which carries the advantage that differently sized engagement heads and wedge means may be attached to an actuating member as required for extraction of differently sized items, the engagement head may of course be integrally formed with the actuating member without straying from the scope of the present invention.

As in the first and second embodiments described above and shown in FIGS. 1–17*a*, a handle 66 is provided at rearward end 54 of actuating member 50 to enable manual rotation of the actuating member and engagement head 58' attached thereto. A slide hammer 68 is preferably mounted on actuating member 50 for manual sliding motion therealong, and an impact block 70 is fixed at rear end 54 for engagement by slide hammer 68 to enable puller 10 and bearing sleeve 2 engaged by the puller to be forced in a rearwardly direction out of blind hole 4.

As indicated, guide member 22' is mounted to actuating means 14 by a threaded stud 72' extending axially through a central threaded opening 74 in guide member 22', whereby rotation of actuating member 50 relative to guide member 22' about longitudinal axis 56 moves actuating member 50 and actuating head 58' closer to or away from forward face 31 of guide member 22', depending on the direction of rotation. It should be noted, however, that stud 72' and central opening 74 need not be threaded.

Figure 19:
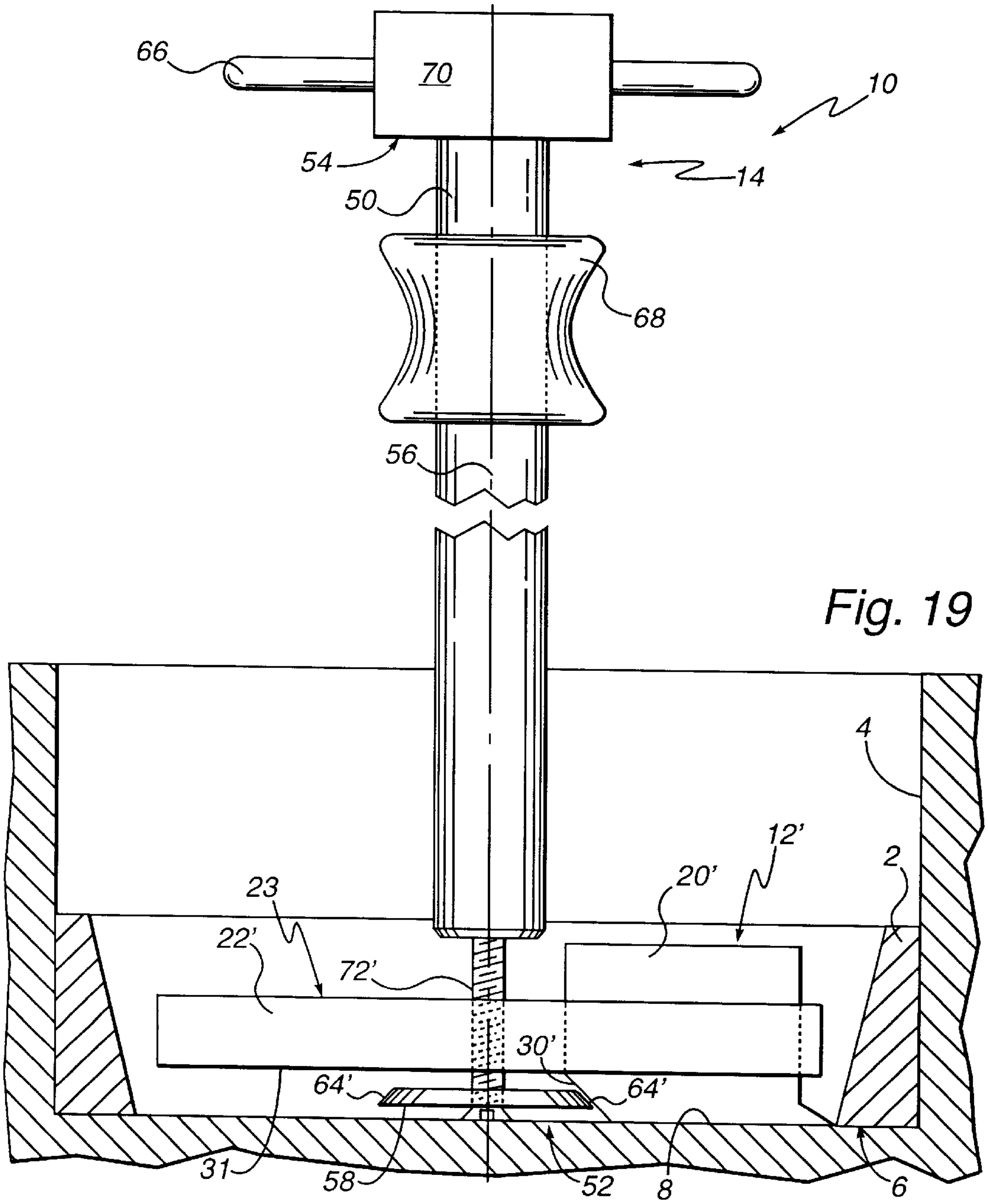
FIG. 19 is a side elevational view thereof, with only one finger being shown in a retracted position in preparation for removal of a bearing sleeve from a blind hole.
Figure 20:
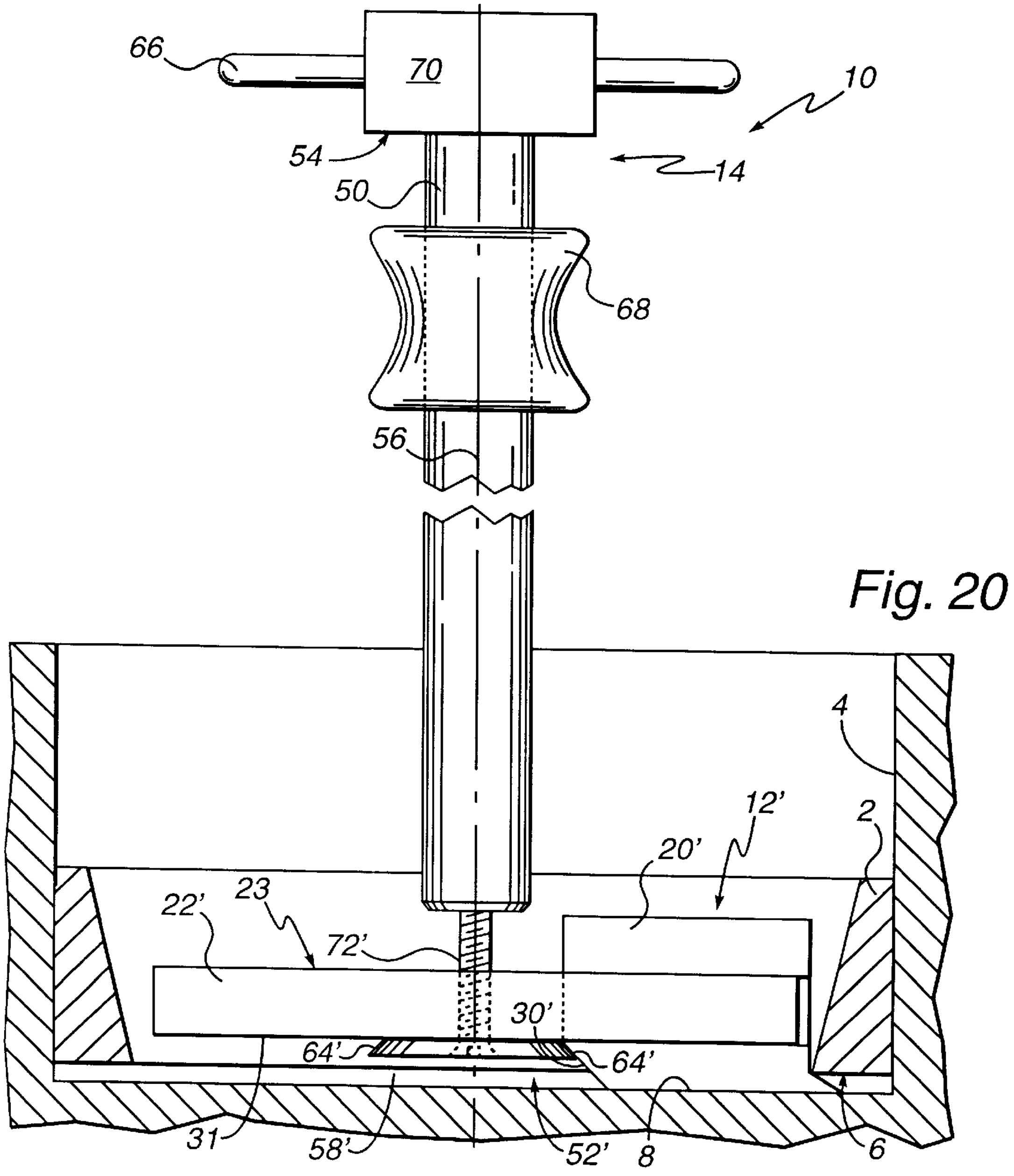
FIG. 20 is a view similar to that of FIG. 19 showing the finger in an extended position during removal of the bearing sleeve from the blind hole.
Figure 21:
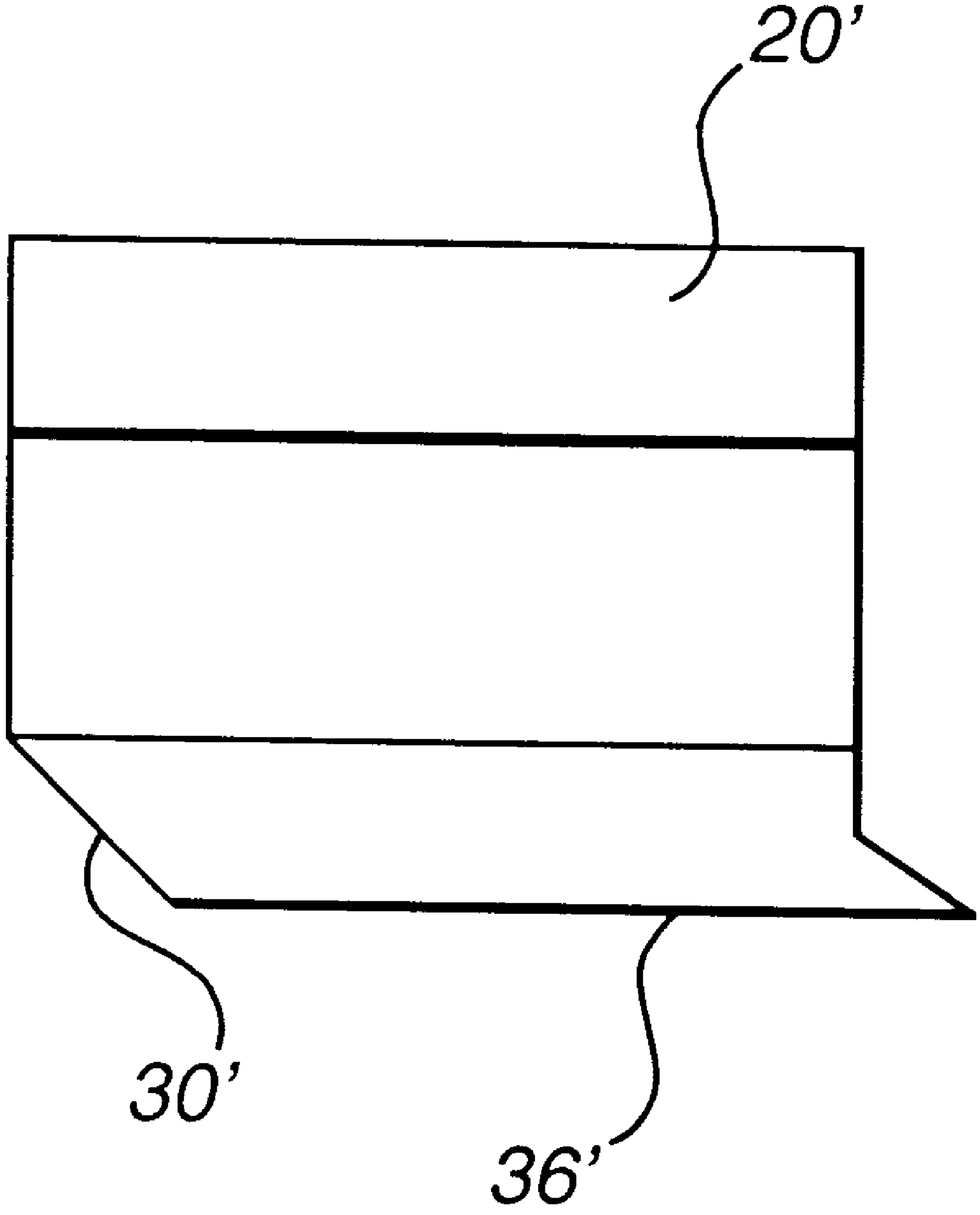
FIG. 21 is a side elevational view of a fourth embodiment of a finger of the present invention.

As will be apparent to those skilled in the art, when engagement head 58' is moved toward forward face 31 of guide member 22', fingers 20' are simultaneously forced radially outward by sliding engagement of chamfer surface 64' with cam surfaces 30' from a retracted position shown in FIG. 19 to an extended position shown in FIG. 20.

To extract bearing sleeve 2 from blind hole 4, a user inserts finger guide member 22' with retracted wedge means 12' within hole 4 and through the axial opening in bearing sleeve 2 until finger base surfaces 36' and insertion edges 40 engage seat surface 8. With wedge means 12' so situated, the user turns handle 66 in a clockwise direction (if threads are left handed) to cause actuating head 58' to move axially rearwardly toward guide member forward face 31, thereby forcing fingers 20' radially outward. Once bearing sleeve 2 is separated from seat surface 8 by wedge portions 34, puller 10 is pulled out of hole 4, if necessary by moving slide hammer 68 in a rearwardly direction until it impacts with impact block 70. Once puller 10 and bearing sleeve 2 have been withdrawn from hole 4, puller 10 may be reset to a retracted condition by rotating actuating member 50 in a counterclockwise direction (if threads are left handed) to move it away from forward face 31, and then manually pushing fingers 20' radially inward toward the center of guide member 22'.

Referring again to FIGS. 10 and 18, O-ring 104 may be set within recesses 105 on front face 106 of fingers 20' to encircle fingers 20' and to bias fingers 20' in an inward direction toward the center of finger guide member 22'. Such biasing will cause fingers 20' to automatically move radially inward upon removal of force from engagement heads 58 and 58'.

Since it is obvious that certain further changes can be made in the foregoing constructions without departing from the spirit and scope of this invention, it is intended that all matter shown in the accompanying drawings or described hereinbefore shall be interrupted as illustrative and not in a limiting sense.

What is claimed is:

1. A puller tool comprising:

an elongated actuating member having a forward end, a rear end, and a longitudinal axis connecting said ends;

a finger guide member mounted at said forward end of said actuating member, said actuating member being axially movable relative to said finger guide member;

said finger guide member threadably mounted on said actuating member and said actuating member having a handle at said rear end for manually rotating said actuating member to effect said axial motion thereof;

a plurality of fingers angularly spaced about said axis and mounted on said finger guide member for radially directed motion normal to said axis, each said finger having a radially inner cam surface and a radially outer wedge surface terminating in a peripheral insertion edge defining a forwardmost extent of said puller tool;

said finger guide member having a plurality of radially extending guide channels for receiving and guiding said plurality of fingers;

a plurality of spring loaded plungers mounted in said finger guide member for engagement with said fingers to increase frictional resistance to said radial directed motion of said fingers and to prevent said fingers from sliding out of said channels;

said actuating member having an engagement head at said forward end arranged to engage said cam surfaces of said plurality of fingers for causing simultaneous radially directed motion thereof incident to axial motion of said actuating member relative to said finger guide member;

a slide hammer slidably mounted on said actuating member for axially directing travel therealong, and an impact member fixed at said rear end of said actuating member for impact by said slide hammer to force said puller tool in a rearward axial direction.

2. A puller tool for removing an object from a hole, comprising:

a finger guide member having a central through bore and containing one or more fingers arranged for radial movement therein;

an elongated actuating member having a rearward end and a forward end which passes through said central through bore;

said finger guide member positioned between said rearward and forward end of said elongated actuating member; and an engagement head mounted to said forward end of said elongated actuating member and operatively arranged to contact said one or more fingers and cause said radial movement when said engagement head is moved toward said finger guide member.

3. The puller tool as recited in claim 2 wherein said through bore is threaded and said elongated actuating member threadably engages the threads of said through bore.

4. The puller tool as recited in claim 2 further comprising a handle mounted to said rearward end of said elongated actuating member and operatively arranged to rotate said elongated actuating member.

5. The puller tool as recited in claim 4 further comprising a slide hammer slidably mounted to said elongated actuating member and operatively arranged to move upwardly along said elongated actuating member to engage said handle.

6. The puller tool as recited in claim 2 wherein said one or more fingers are comprised of an outer wedge surface terminating in an insertion edge.

7. The puller tool as recited in claim 6 wherein said insertion edge is positioned below a forward face of said finger guide member.

8. The puller tool as recited in claim 2 wherein said finger guide member further comprises one or more guide channels.

9. The puller tool as recited in claim 8 wherein said one or more fingers are mounted in said one or more guide channels.

10. The puller tool as recited in claim 2 wherein said one or more fingers are additionally comprised of a recessed portion on an outward face thereof and an O-ring set within said recessed portion to bias said one or more fingers toward a center of said finger guide member.

* * * * *